United States Patent
Ikebukuro

(10) Patent No.: US 9,615,558 B2
(45) Date of Patent: Apr. 11, 2017

(54) DUAL-BEARING REEL

(71) Applicant: Shimano Inc., Sakai, Osaka (JP)

(72) Inventor: Satoshi Ikebukuro, Osaka (JP)

(73) Assignee: Shimano Inc., Osaka (JP)

( * ) Notice: Subject to any disclaimer, the term of this patent is extended or adjusted under 35 U.S.C. 154(b) by 142 days.

(21) Appl. No.: 14/674,271

(22) Filed: Mar. 31, 2015

(65) Prior Publication Data

US 2015/0327527 A1 Nov. 19, 2015

(30) Foreign Application Priority Data

May 16, 2014 (JP) ................................. 2014-101952

(51) Int. Cl.
*A01K 89/01* (2006.01)
*A01K 89/015* (2006.01)
*A01K 89/00* (2006.01)

(52) U.S. Cl.
CPC ........ *A01K 89/0186* (2015.05); *A01K 89/006* (2013.01); *A01K 89/0192* (2015.05)

(58) Field of Classification Search
CPC .............. A01K 89/015; A01K 89/0186; A01K 89/0188; A01K 89/0189
See application file for complete search history.

(56) References Cited

U.S. PATENT DOCUMENTS

| | | | | |
|---|---|---|---|---|
| 2004/0144877 A1* | 7/2004 | Kawasaki | ............ | A01K 89/015 242/278 |
| 2006/0006267 A1* | 1/2006 | Hirayama | ............ | A01K 89/015 242/223 |
| 2007/0181728 A1* | 8/2007 | Kawasaki | .............. | A01K 89/00 242/310 |
| 2012/0067993 A1* | 3/2012 | Nakagawa | ........... | A01K 89/015 242/257 |

FOREIGN PATENT DOCUMENTS

JP 2009-82071 A 4/2009

* cited by examiner

*Primary Examiner* — Emmanuel M Marcelo
(74) *Attorney, Agent, or Firm* — Global IP Counselors, LLP

(57) ABSTRACT

A dual-bearing reel includes a spool, a handle, a clutch mechanism, a first side plate, a second side plate, and a clutch operating member. The first side plate is disposed on a first side with respect to the spool. The second side plate is disposed on a second side with respect to the spool. The clutch operating member includes a main body portion and a first side end. The main body portion extends along the axial direction between the first side plate and the second side plate. The first side end extends along the axial direction. The first side plate includes a first guide groove that slidably supports the first side end. The second side plate includes a second guide groove that slidably supports the main body portion.

12 Claims, 12 Drawing Sheets

DUAL-BEARING REEL

CROSS-REFERENCE TO RELATED APPLICATIONS

This application claims priority to Japanese Patent Application JP 2014-101952 filed on May 16, 2014, the entirety of which is hereby incorporated herein by reference in its entirety.

BACKGROUND

Field of the Invention

The present invention relates to a dual-bearing reel.

Background Information

As disclosed in Japanese Laid-Open Patent Publication No. 2009-082071, a conventional dual-bearing reel comprises a spool, a reel body, a clutch mechanism, and a clutch operating member. The reel body comprises first and second side plates disposed at an interval in the axial direction. The spool is rotatably disposed between the first side plate and the second side plate.

The handle is attached to the second side plate side of the reel body. The spool is rotated by turning the handle to wind the fishing line. The clutch mechanism is configured to engage or disengage the handle and the spool. For example, the handle and the spool are engaged and disengaged by operating the clutch mechanism with a clutch operating member.

In a dual-bearing reel configured in the manner described above, an angler may operate the spool or the fishing rod while palming. When palming, the reel body is grasped along with the fishing rod from the first side plate side.

SUMMARY

It has been found that a dual-bearing reel with improved fit during palming is in demand so as to enable more comfortable fishing.

The object of the present invention is to provide a dual-bearing reel that is capable of improving the reel fit while palming.

A dual-bearing reel according to one aspect of the present invention unreels (casts) fishing line a forward direction. The dual-bearing reel comprises a spool, a handle, a clutch mechanism, a first side plate, a second side plate, and a clutch operating member. The spool is configured to rotate around a rotational axis. The handle is configured to rotate the spool. The clutch mechanism is configured to engage or disengage the handle and the spool. The first side plate is disposed on a first side in the axial direction with respect to the spool. The second side plate is disposed on a second side in the axial direction with respect to the spool. The clutch operating member is configured to operate the clutch mechanism. The clutch operating member comprises a main body portion and a first side end. The main body portion extends along the axial direction of the rotational axis between the first side plate and the second side plate. The first side end extends along the axial direction. The first side end is disposed to be closer to the rotational axis than to the main body portion. The first side plate comprises a first guide groove that slidably supports the first side end. The second side plate comprises a second guide groove that slidably supports the main body portion.

According to this configuration, the first side end of the clutch operating member is disposed to be closer to the rotational axis than to the main body portion. For this reason, it is possible to dispose the first guide groove, which holds the first side end, closer to the rotational axis than to the second guide groove. As a result, it is possible to make a first guide groove in the first side plate that is smaller than the second side plate, improving the reel fit while palming.

Preferably, the clutch operating member further comprises a stepped portion disposed between the main body portion and the first side end.

Preferably, the first side plate comprises a first side plate body portion and a first support portion. The first support portion is fixed to the first side plate body portion. The first support portion comprises a first guide groove.

Preferably, the second side plate comprises a second side plate body portion and a second support portion. The second support portion is fixed to the second side plate body portion. The second support portion comprises a second guide groove.

Preferably, the width of the first side end is smaller than the width of the body portion. According to this configuration, since the width of the first side end is smaller than the width of the body portion, the movable region of the first side end is smaller than the movable region of the body portion. For this reason, it is possible to make the width of the first guide groove that supports the first side end smaller than the width of the second guide groove. As a result, it is possible to make the first side plate with the first guide groove smaller than the second side plate.

Preferably, at least either the first guide groove or the second guide groove has a circular arc shape with a rotational axis as the center.

Preferably, the first and the second guide grooves have a circular arc shape with a rotational axis as the center. The radius of the first guide groove is smaller than the radius of the second guide groove. According to this configuration, it is possible to make the first side plate smaller than the second side plate, improving the reel fit while palming.

Preferably, the length of the first guide groove is shorter than the length of the second guide groove. According to this configuration, it is possible to make the first side plate smaller than the second side plate, improving the reel fit while palming.

At least either the first guide groove or the second guide groove may extend linearly.

Preferably, the first and the second side plates are circular from the side view. The radius of the first side plate is smaller than the radius of the second side plate.

Preferably, the width of the first guide groove is smaller than the width of the second guide groove.

Preferably, the first guide groove is disposed on the outer peripheral part of the first side plate, and the second guide groove is disposed on the outer peripheral part of the second side plate.

Preferably, the main body portion and the first side end are positioned behind the spool.

With the dual-bearing reel according to the present invention, it is possible to improve the reel fit while palming.

BRIEF DESCRIPTION OF THE DRAWINGS

Referring now to the attached drawings which form a part of the original disclosure.

DETAILED DESCRIPTION OF EMBODIMENTS

Figure 1:
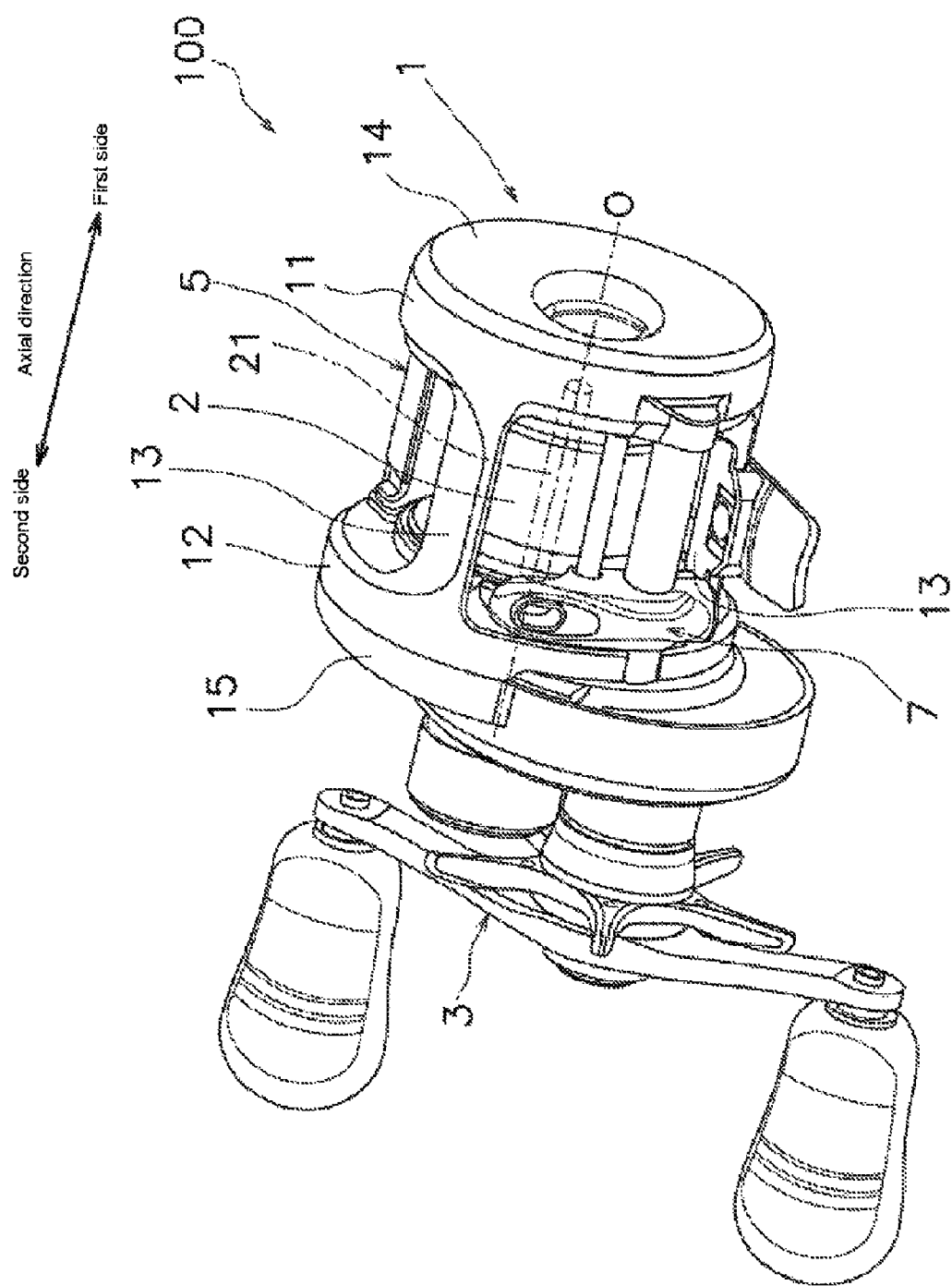
FIG. 1 is a perspective view of a dual-bearing reel.

Embodiments of the dual-bearing reel according to the present invention will be explained below, with reference to the drawings. The dual-bearing reel is configured to cast fishing line in a forward direction. FIG. 1 is a perspective view of a dual-bearing reel. Meanwhile, in the following explanation, the rotational axis represents the rotational axis of the spool. Specifically, the rotational axis represents the center axis of the spool shaft. The axial direction represents the direction in which the rotational axis extends. Specifically, the axial direction represents the direction in which the center axis of the spool shaft extends. The radial direction represents the radial direction of a circle with the rotational axis as the center. The circumferential direction represents the circumferential direction of the circle with the rotational axis as the center. The side view represents a view of the dual-bearing reel along the axial direction.

As shown in FIG. 1, the dual-bearing reel 100 comprises a reel body 1, a spool 2, a handle 3, a clutch mechanism 4 (refer to FIG. 7), and a clutch operating member 5. The dual-bearing reel 100 further comprises a rotation transmission mechanism 6 (refer to FIG. 6).

As shown in FIG. 1, the reel body 1 comprises a first side plate 11 and a second side plate 12. The first side plate 11 and the second side plate 12 are disposed at an interval from each other in the axial direction. The first side plate 11 is disposed on a first side of the spool 2 in the axial direction. The second side plate 12 is disposed on a second side of the spool 2 in the axial direction.

The first side plate 11 and the second side plate 12 are connected by a plurality of connecting portions 13 extending in the axial direction. Meanwhile, although not particularly limited, the first side plate 11, the second side plate 12, and each of the connecting portions 13 are formed by a single member. Specifically, the frame of the reel body 1 is formed from the first side plate 11, the second side plate 12, and each connecting portion 13.

A first side cover 14 is attached to the first side plate 11. Various mechanisms are housed in the space that is defined by the first side plate 11 and the first side cover 14. For example, a brake mechanism (not shown) for preventing backlash, etc. is disposed in this space. The first side plate 11 and the first side cover 14 may be formed from one member.

A second side plate 12 is attached to the second side cover 15. The second side cover 15 is formed in the shape of two, partially overlapping circles from the side view. Various mechanisms are housed in the space that is defined by the second side plate 12 and the second side cover 15. For example, the rotation transmission mechanism 6 is disposed in this space.

Figure 2:
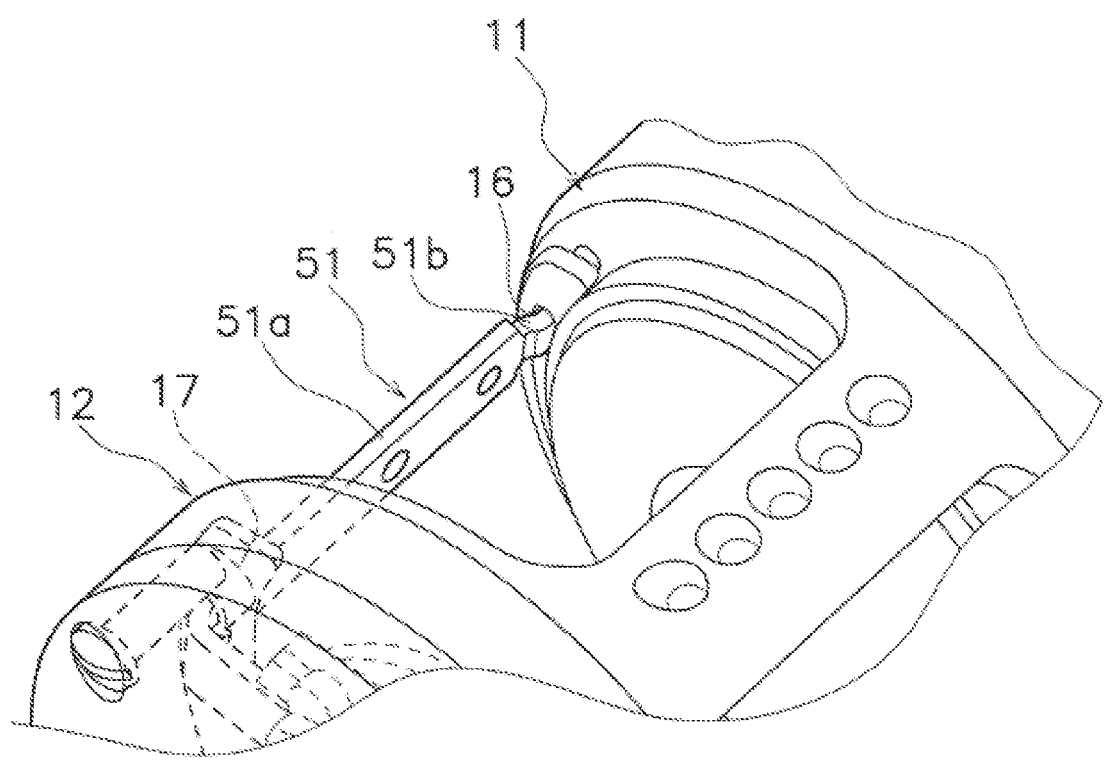
FIG. 2 is an enlarged perspective view of a dual-bearing reel.

FIG. 2 is an enlarged perspective view of a dual-bearing reel. Meanwhile, in FIG. 2, a cover member mentioned below has been removed from the clutch plate 51. As shown in FIG. 2, the first side plate 11 comprises a first guide groove 16, and the second side plate 12 comprises a second guide groove 17. The first guide groove 16 is configured to slidably support a first side end 51*b* of the clutch operating member 5. The second guide groove 17 is configured to slidably support a main body portion 51*a* of the clutch operating member 5. The first guide groove 16 is disposed on the outer peripheral part of the first side plate 11. The second guide groove 17 is disposed on the outer peripheral part of the second side plate 12.

Figure 3:
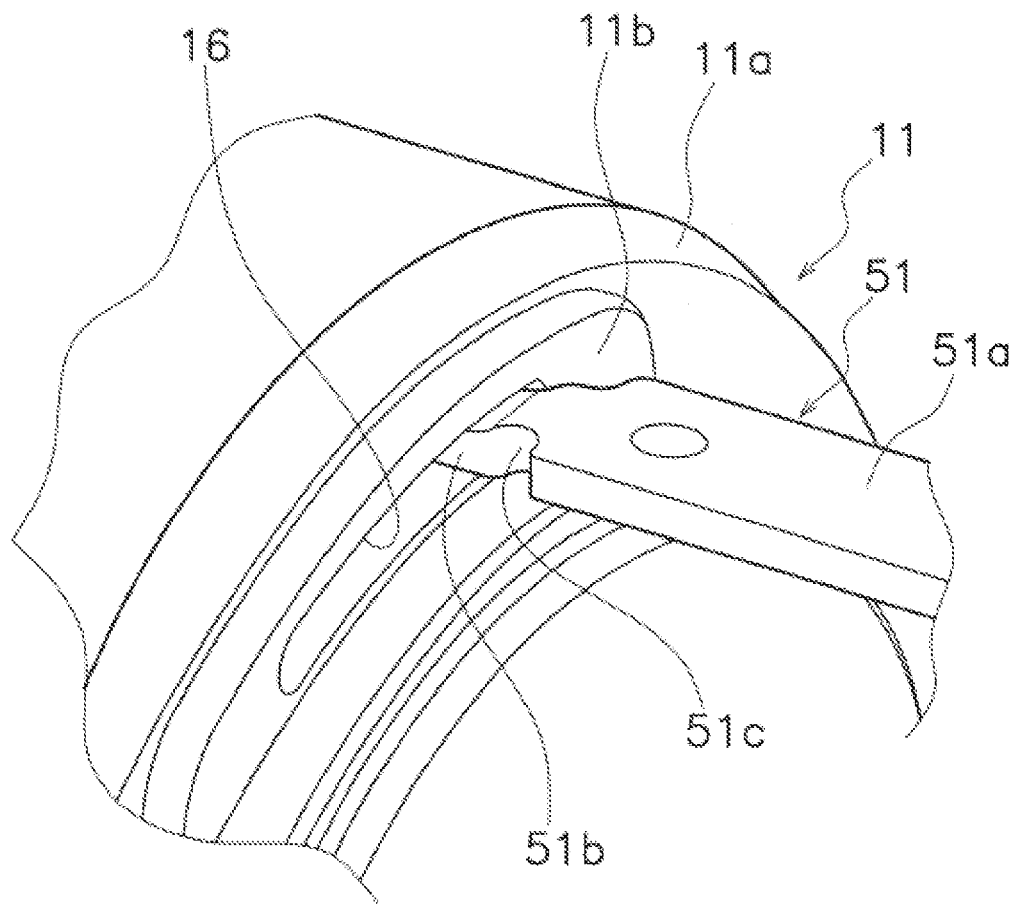
FIG. 3 is an enlarged perspective view of a dual-bearing reel.

In particular, as shown in FIG. 3, the first side plate 11 comprises a first side plate main body portion 11*a* and a first support portion 11*b*. The first support portion 11*b* is fixed to the first side plate main body portion 11*a*. The first support portion 11*b* comprises the first guide groove 16 described above.

Figure 4:
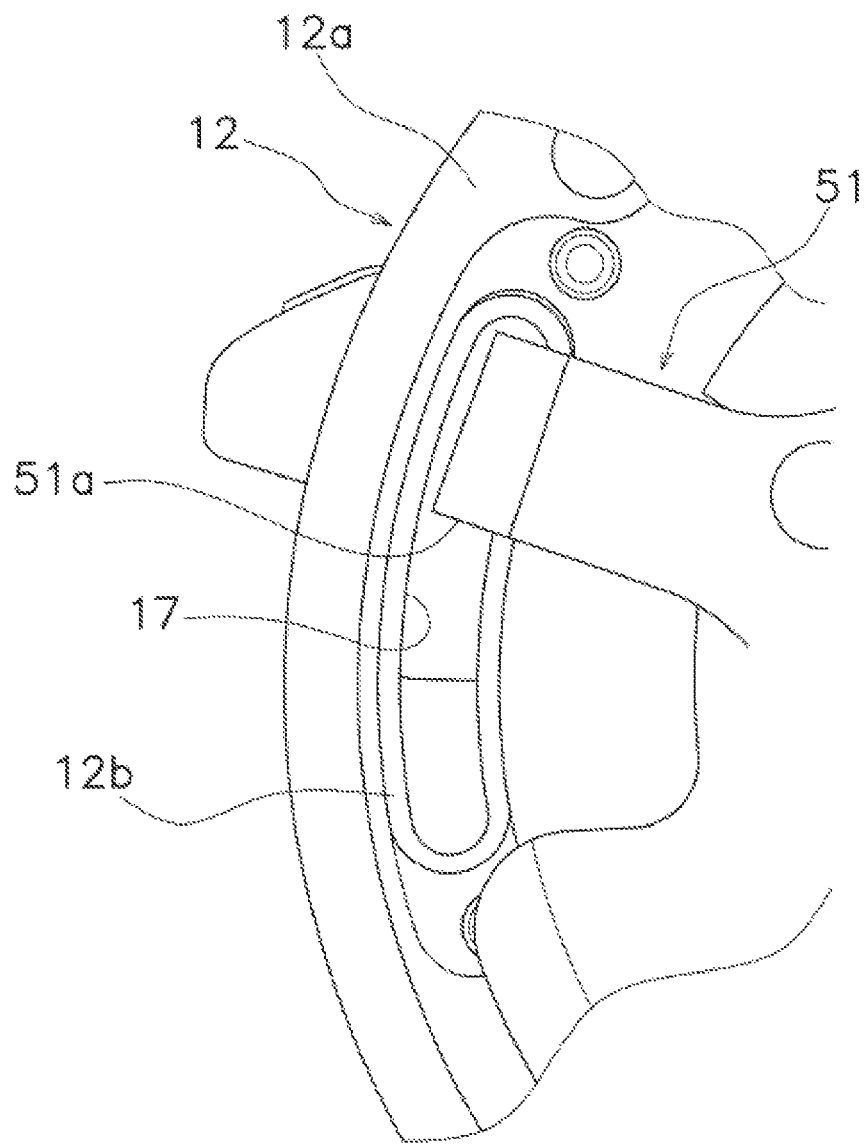
FIG. 4 is an enlarged side view of the dual-bearing reel.

FIG. 4 is a side view showing a part of the second side plate, as viewed from the second side in the axial direction. In FIG. 4, the second side cover has been removed from the second side plate. As shown in FIG. 4, the second side plate 12 comprises a side plate main body portion 12*a* and a second support portion 12*b*. The second support portion 12*b* is fixed to the second side plate main body portion 12*a*. The second support portion 12*b* comprises the second guide groove 17 described above.

As shown in FIG. 3 and FIG. 4, the first guide groove 16 and the second guide groove 17 are formed to have a circular arc shape with a rotational axis as the center. The radius of the first guide groove 16 is smaller than the radius of the second guide groove 17. In particular, the radius of the outer peripheral edge of the first guide groove 16 is smaller than the radius of the outer peripheral edge of the second guide groove 17. For example, the radius of the outer peripheral edge of the first guide groove 16 is about equal to or greater than 23.5 mm and equal to or less than 25.0 mm. The radius of the outer peripheral edge of the second guide groove 17 is about equal to or greater than 24.5 mm and equal to or less than 26.0 mm.

The length of the first guide groove 16 is shorter than the length of the second guide groove 17. The length of each guide groove refers to the length in the circumferential direction, i.e., the length of the arc of each guide groove. For example, the length of the first guide groove 16 is about equal to or greater than 13.0 mm and equal to or less than 15.0 mm. The length of the second guide groove 17 is about equal to or greater than 16.0 mm and equal to or less than 18.0 mm. The width of the first guide groove 16 is smaller than the width of the second guide groove 17. For example, the width of the first guide groove 16 is about equal to or greater than 1.5 mm and equal to or less than 2.0 mm. The width of the second guide groove 17 is about equal to or greater than 2.2 mm and equal to or less than 2.8 mm. Here, the widths of the first and second guide grooves 16 and 17 represent the length of each guide groove in the radial direction.

Figure 5:
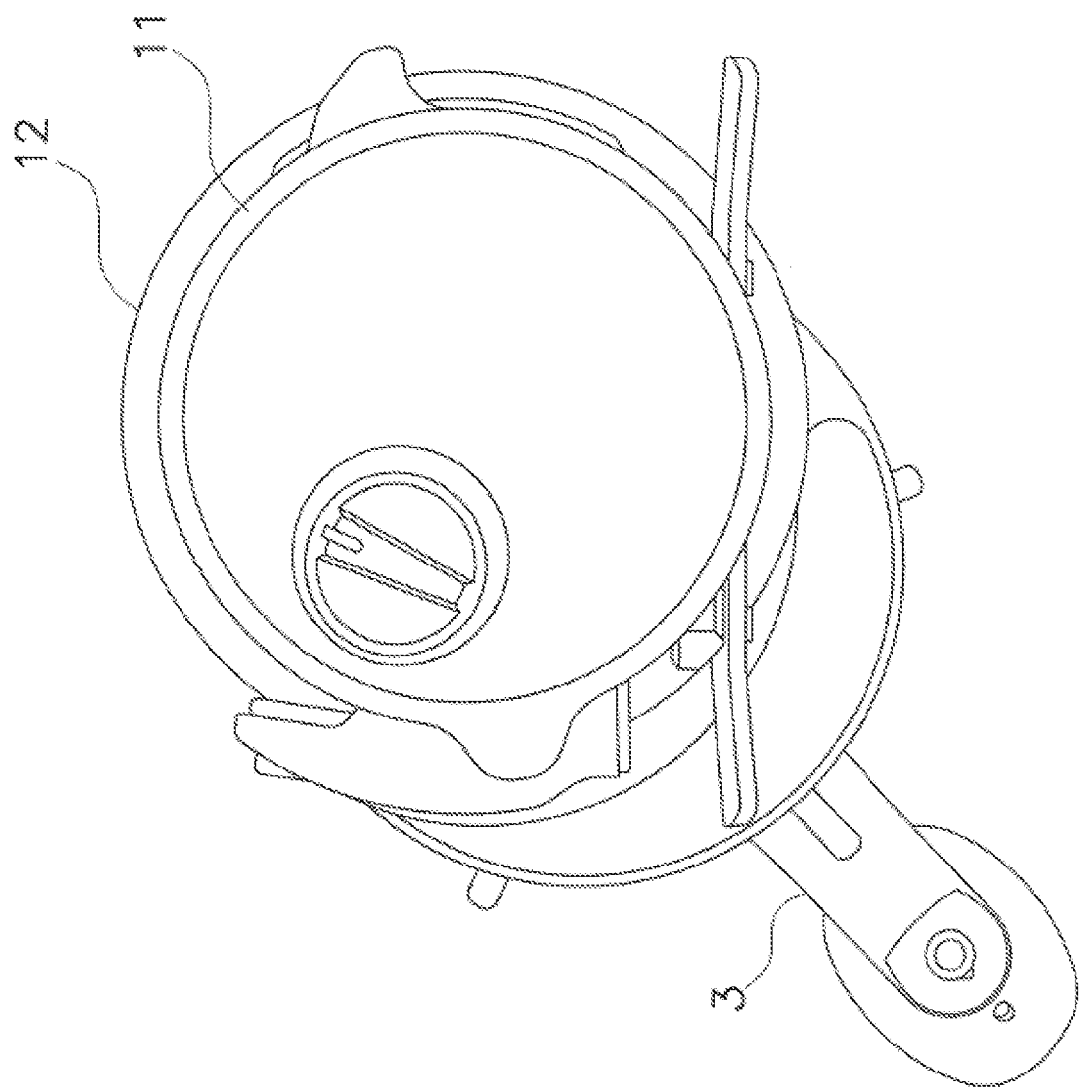
FIG. 5 is a side view of the dual-bearing reel.

FIG. 5 is a side view of the dual-bearing reel, as viewed from the first side. As shown in FIG. 5, the first side plate 11 and the second side plate 12 are substantially circular from the side view. The radius of the first side plate 11 is smaller than the radius of the second side plate 12.

As shown in FIG. 1, the handle 3 is configured to rotate the spool 2. Specifically, the handle 3 is rotatably mounted to the outer side surface on the second side of the reel body 1. The spool 2 is driven via the rotation transmission mechanism 6 by rotating the handle 3. Additionally, a level winding mechanism 7 is driven in parallel by rotating the handle 3.

Figure 6:
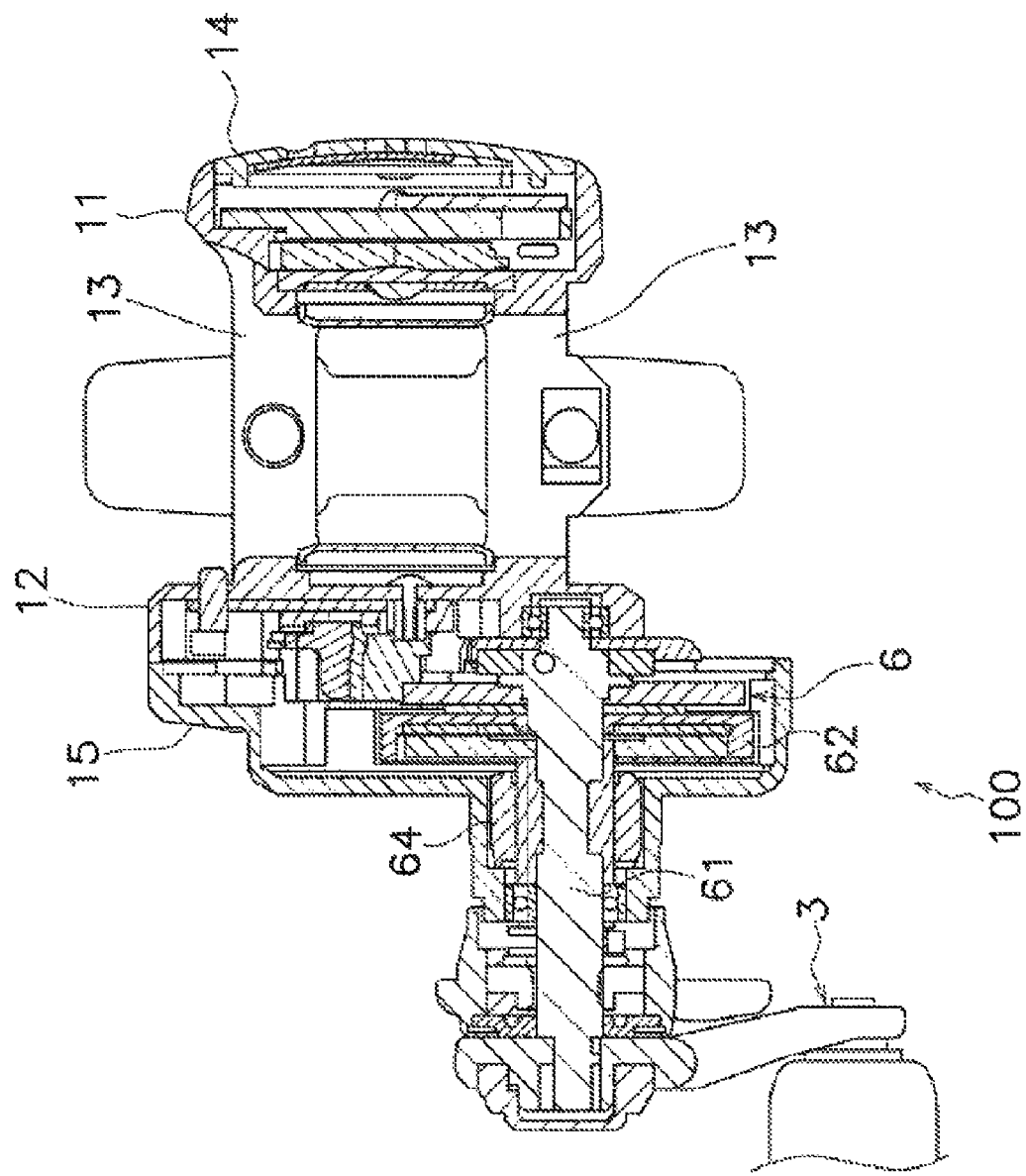
FIG. 6 is a cross-sectional view of the dual-bearing reel.

As shown in FIG. 6, the rotation transmission mechanism 6 is configured to transmit the rotation of the handle 3 to the spool 2. The rotation transmission mechanism 6 is also configured to simultaneously transmit the rotation of the handle 3 to the level winding mechanism 7. The rotation transmission mechanism 6 is installed in a space that is defined by the second side plate 12 and the second side cover 15, as described above. The rotation transmission mechanism 6 comprises a drive shaft 61, a drive gear 62, and a pinion gear 63.

The drive shaft 61 is engaged with the handle 3 and integrally rotates with the handle 3. Meanwhile, the drive shaft 61 is prohibited from rotating in the casting direction by a one-way clutch 64. That is, the drive shaft 61 only rotates in the line winding direction. The drive gear 62 is mounted to the drive shaft 61 and integrally rotates with the drive shaft 61.

Figure 7:
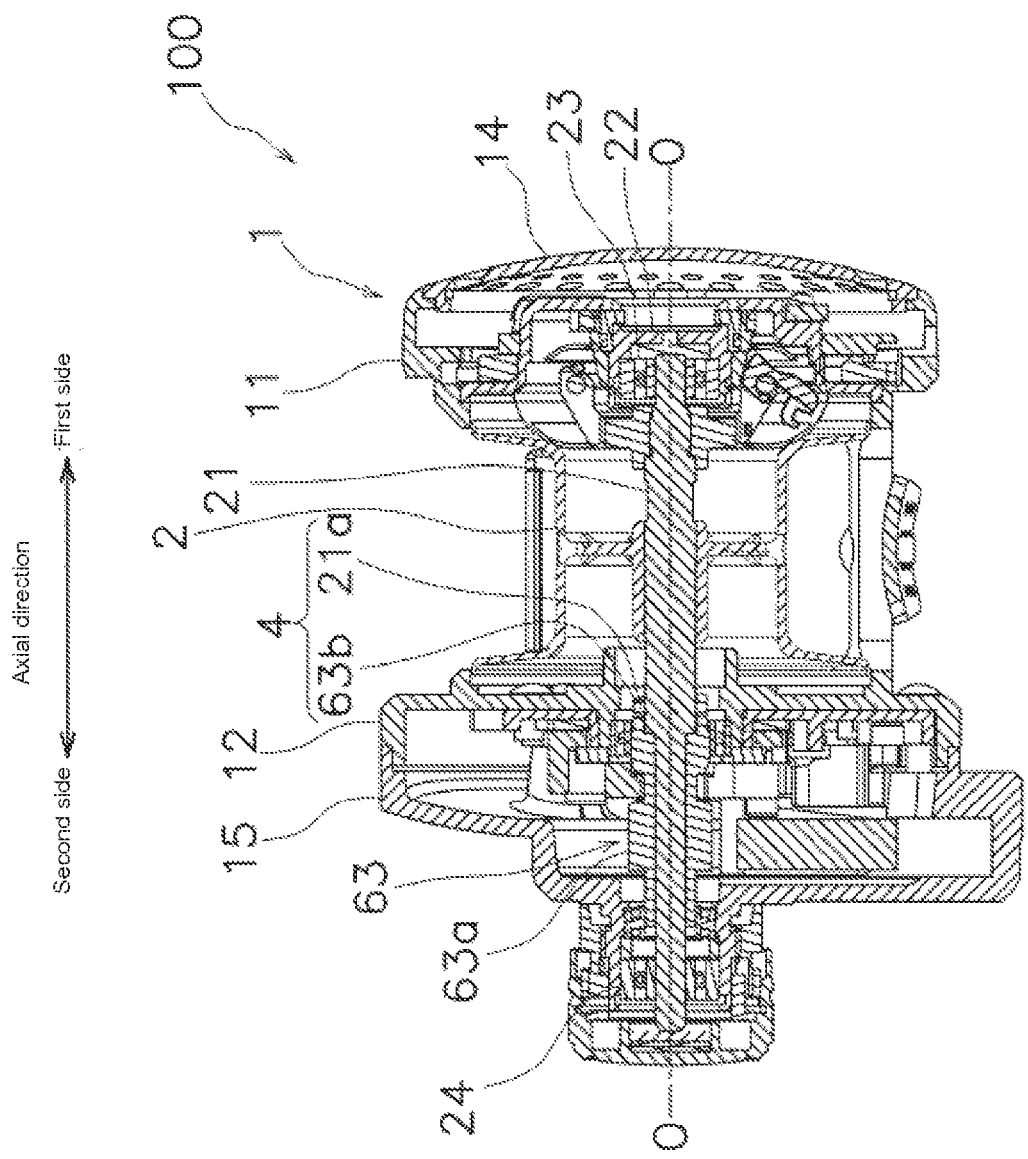
FIG. 7 is a cross-sectional view of the dual-bearing reel.

FIG. 7 is a cross-sectional view of the dual-bearing reel, as viewed from the front. As shown in FIG. 7, the pinion gear 63 comprises a gear portion 63a that meshes with the drive gear 62. The pinion gear 63 has a tubular shape. A spool shaft 21 extends through the center of the pinion gear 63. The pinion gear 63 is rotatably supported by the reel body 1. In particular, the pinion gear 63 is supported by the second side plate 12 and the second side cover 15 via an axle bearing member.

The pinion gear 63 is mounted to the spool shaft 21 so as to be slidable in the axial direction. The pinion gear 63 comprises an engagement portion 63b. The engagement portion 63b is configured to engage an engagement pin 211a of the spool shaft 21. Specifically, the engagement portion 63b is formed from a plurality of notched portions configured to engage the engagement pin 21a. The engagement pin 21a is configured to protrude radially from the outer peripheral surface of the spool shaft 21.

The clutch mechanism 4 is configured to engage or disengage the handle 3 and the spool 2. Specifically, the above-described engagement portion 63b and engagement pin 21a configure the clutch mechanism 4. When the pinion gear 63 moves to the first side in the axial direction, the engagement portion 63b and the engagement pin 21a are engaged. The handle 3 and the spool 2 are thereby engaged. That is, the rotation of the handle 3 and the rotation of the spool 2 are linked. On the other hand, when the pinion gear 63 moves to the second side in the axial direction, the engagement between the engagement portion 63b and the engagement pin 21a is disengaged. The handle 3 and the spool 2 are thereby disengaged. That is, the rotation of the handle 3 and the rotation of the spool 2 are not linked. For example, even when the spool 2 is rotated when casting, the handle 3 will not rotate.

The spool 2 is configured to rotate around a rotational axis. Specifically, the spool 2 is fixed to a spool shaft 21 and integrally rotates with the spool shaft 21. The center axis O of this spool shaft 21 corresponds to the rotational axis.

The spool 2 is disposed between the first side plate 11 and the second side plate 12. Fishing line is wound on the outer peripheral surface of the spool 2. The spool shaft 21 extends between the first side plate 11 and the second side plate 12. The spool shaft 21 is rotatably supported by the reel body 1 via an axle bearing member, etc. For example, the first side end of the spool shaft 21 is rotatably supported by a support member 22 that is fixed to the first side plate 11 via an axle bearing member 23. Meanwhile, the axle bearing member 23 is fixed to the support member 22. The second side end of the spool shaft 21 is rotatably supported by the second side cover 15 via an axle bearing member 24.

Figure 8:
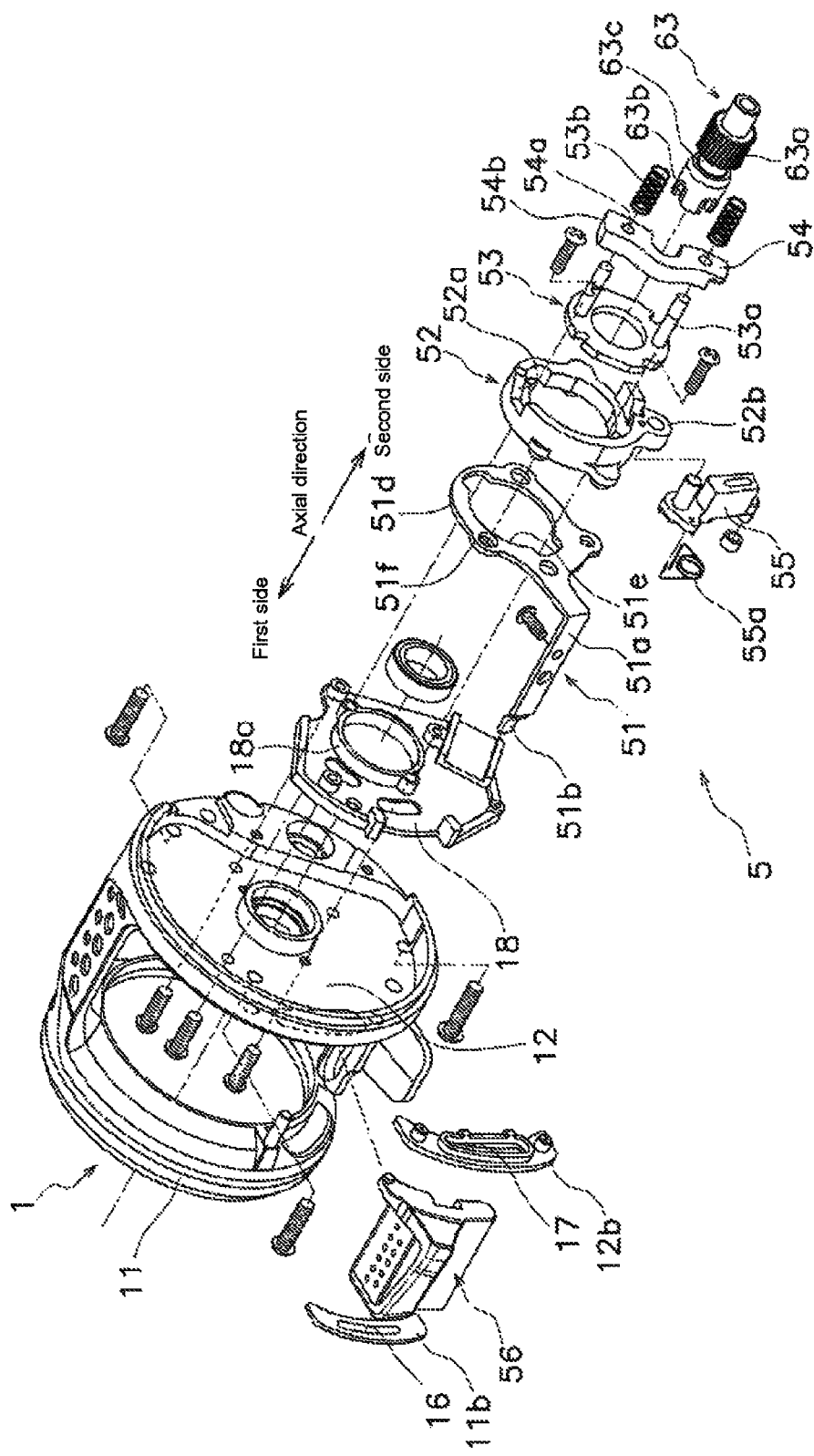
FIG. 8 is an exploded view of the dual-bearing reel.

The clutch operating member 5 is configured to operate the clutch mechanism 4. In particular, the clutch operating member 5 comprises a clutch plate 51, as shown in FIG. 8.

The clutch operating member 5 further comprises a clutch cam 52, a retainer plate 53, a clutch yoke 54, and a cover member 56.

Figure 9:
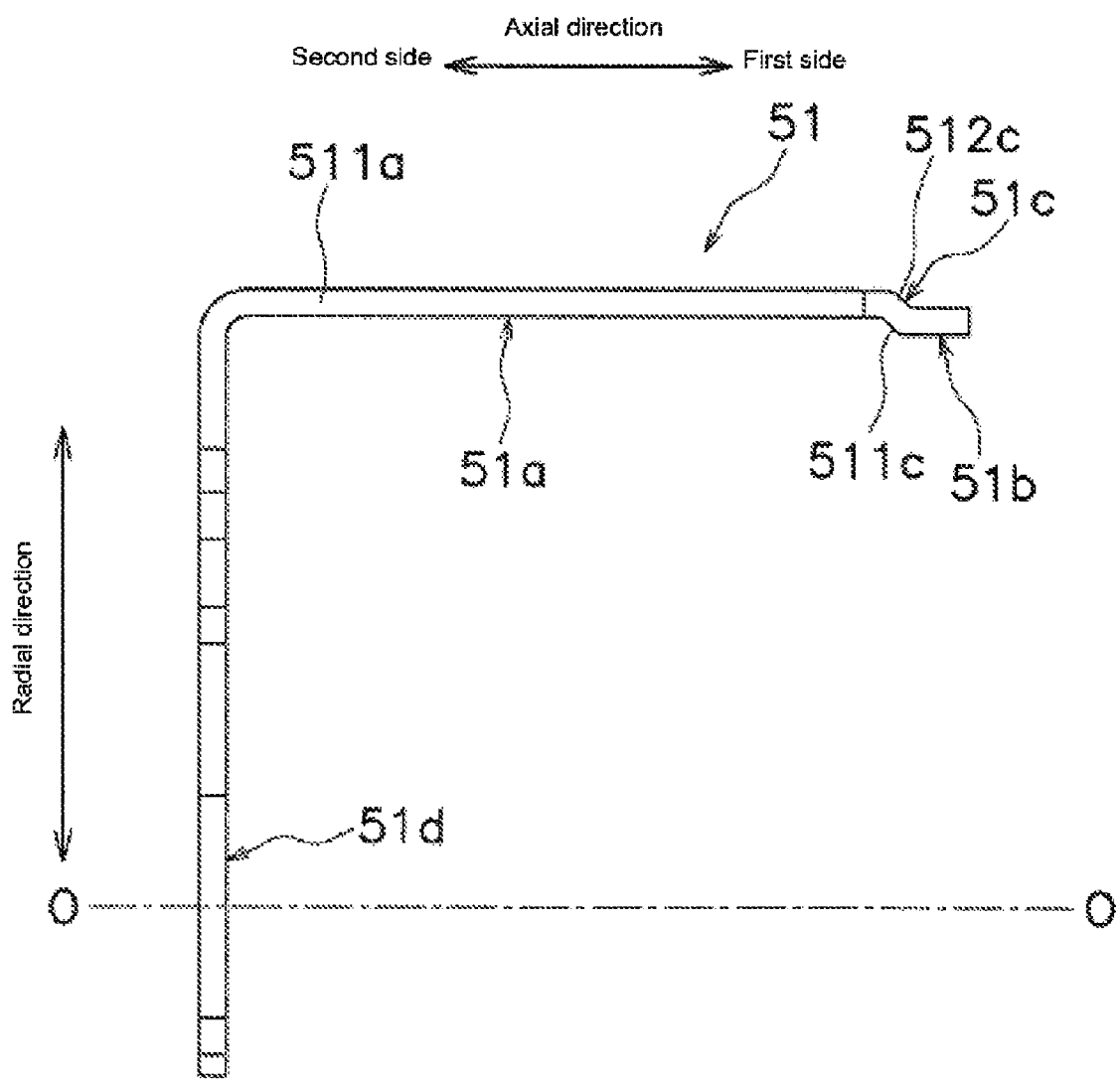
FIG. 9 is a frontal view of a clutch plate.

As shown in FIG. 9, the clutch plate 51 comprises a main body portion 51a, a first side end 51b, and a stepped portion 51c. The clutch plate 51 further comprises a mounting portion 51d. The main body portion 51a, the first side end 51b, the stepped portion 51c, and the mounting portion 51d are formed by a single member. For example, the clutch plate 51 is made of metal.

The main body portion 51a extends along the axial direction between the first side plate 11 and the second side plate 12. The main body portion 51a is slidably supported by the second guide groove 17. Specifically, a second side end 511a of the main body portion 51a is slidably supported by the second guide groove 17. The main body portion 51a slides in the circumferential direction. The main body portion 51a has a rectangular shape.

The first side end 51b extends along the axial direction and is disposed to be closer to the rotational axis O than to the main body portion 51a. The first side end 51b is slidably supported by the first guide groove 16. The first side end 51b slides in the circumferential direction.

Figure 10:
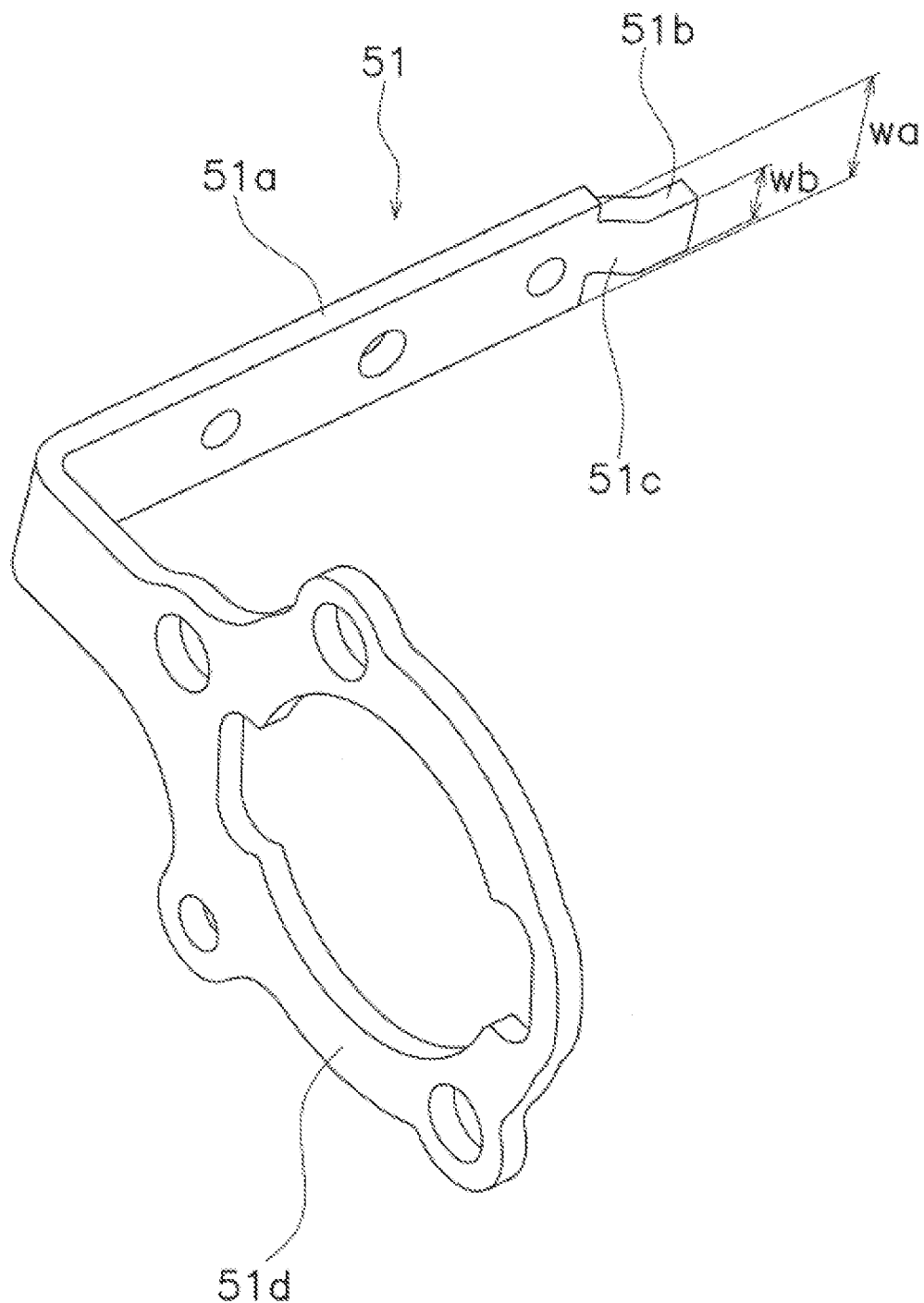
FIG. 10 is a perspective view of the clutch plate.

The width wb of the first side end 51b is smaller than the width wa of the main body portion 51a, as shown in FIG. 10. Meanwhile, the width wa of the main body portion 51a and the width wb of the first side end 51b represent the lengths in the direction that is perpendicular to the longitudinal direction of the main body portion 51a. In other words, the width wa of the main body portion 51a and the width wb of the first side end 51b represent the lengths extending substantially along the tangential direction of the circumference. For example, the width wb of the first side end 51b is about equal to or greater than 2 mm and equal to or less than 5 mm. The width wa of the main body portion 51a is about equal to or greater than 5 mm and equal to or less than 8 mm.

As shown in FIG. 9, the stepped portion 51c is disposed between the main body portion 51a and the first side end 51b. Specifically, the stepped portion 51c extends in the radial direction. The radially inner end 511c of the stepped portion 51c is engaged to the first side end 51b. The radially outer end 512c of the stepped portion 51c is engaged to the main body portion 51a.

Since a stepped portion 51c is disposed between the main body portion 51a and the first side end 51b in this manner, the first side end 51b is in a position that is closer to the rotational axis O in the radial direction than to the main body portion 51a. That is, the turning radius of the first side end 51b is smaller than the turning radius of the main body portion 51a. The main body portion 51a, the first side end 51b, and the stepped portion 51c are disposed behind the spool 2.

The mounting portion 51d is a portion that is mounted to the reel body 1. As shown in FIG. 8, the mounting portion 51d is rotatably mounted to the reel body 1. Specifically, the mounting portion 51d is mounted to an attaching plate 18. The attaching plate 18 is fixed to the second side plate 12. The attaching plate 18 comprises a boss portion 18a. The boss portion 18a has a cylindrical shape and protrudes toward the second side in the axial direction. The mounting portion 51d comprises an opening in the center portion. The mounting portion 51d is rotatably mounted to the boss portion 18a, with the boss portion 18a being inserted in the opening 51e of this mounting portion 51d.

The clutch cam 52 rotates in conjunction with the clutch plate 51. The clutch cam 52 is disposed to rotate about the rotational axis O. The clutch cam 52 is rotatably attached to the attaching plate 18. Specifically, the clutch cam 52 comprises an opening in the center portion. The clutch cam 52 is rotatably mounted to the boss portion 18*a*, with the boss portion 18*a* of the attaching plate 18 being inserted in this opening.

The clutch cam 52 comprises a cam surface 52*a* and a protrusion 52*b*. The cam surface 52*a* is configured to press the clutch yoke 54 to the second side in the axial direction via the retainer plate 53. Specifically, when the clutch cam 52 is rotated counterclockwise, when viewed from the second side in the axial direction, the cam surface 52*a* presses the clutch yoke 54 to the second side in the axial direction, and the clutch yoke 54 moves to the second side in the axial direction. The clutch cam 52 is, for example, made of a synthetic resin.

The protrusion 52*b* is a portion that protrudes radially outward and a portion to which a return member 55 mentioned below is mounted. The clutch cam 52 further comprises an engagement protrusion (not shown). The engagement protrusion protrudes to the first side in the axial direction. This engagement protrusion engages an engagement hole 51*f* of the clutch plate 51. With this engagement, the clutch plate 51 and the clutch cam 52 integrally rotate about the rotational axis O.

The clutch yoke 54 comprises an engagement portion 54*b*. The clutch yoke 54 is pressed to the second side in the axial direction with the cam surface 52*a* engaging the engagement portion 54*b* of the clutch yoke 54. The clutch yoke 54 is movably supported by the retainer plate 53 in the axial direction. The retainer plate 53 is disposed in each opening of the clutch plate 51 and the clutch cam 52. Additionally, the retainer plate 53 is fixed to the attaching plate 18.

The retainer plate 53 comprises a plurality of pins 53*a* that extend in the axial direction. Each pin 53*a* extends to the second side in the axial direction. The clutch yoke 54 comprises a through-hole 54*a* in a position corresponding to each pin 53*a*. The clutch yoke 54 is movably supported in the axial direction, with each pin 53*a* being inserted in each through-hole 54*a*.

The clutch yoke 54 is configured so as to engage with a constricted portion 63*c* of the pinion gear 63. For this reason, the pinion gear 63 moves in the axial direction in conjunction with the clutch yoke 54. Meanwhile, the configuration is such that the clutch yoke 54 will not rotate even if the pinion gear 63 rotates. The clutch yoke 54 is biased to the first side in the axial direction by a biasing member. Specifically, a plurality of coil springs 53*b* supported by the pins 53*a* of the retainer plate 53 biases the clutch yoke 54 to the first side in the axial direction.

In a normal state, the clutch yoke 54 is biased to the first side in the axial direction by each coil spring 53*b*. For this reason, the engagement portion 63*b* of the pinion gear 63 engages the engagement pin 21*a* of the spool shaft 21. That is, the clutch mechanism 4 engages the handle 3 and the spool 2. In contrast, when the clutch yoke 54 moves to the second side in the axial direction by operating the clutch plate 51, the engagement between the engagement portion 63*b* of the pinion gear 63 and the engagement pin 21*a* is disengaged. As a result, the clutch mechanism 4 disengages the handle 3 and the spool 2.

The return member 55 is pivotally mounted to the protrusion 52*b* of the clutch cam 52. The return member 55 comprises a pawl portion. The pawl portion abuts the outer peripheral part of a ratchet wheel (not shown) that integrally rotates with the drive shaft 61. The return member 55 is biased in both directions of the pivoting direction by a toggle spring 55*a*. The clutch cam 52 moves to the first side in the axial direction with the pawl portion of the return member 55 being pressed by the rotation of the ratchet wheel. In other words, the clutch cam 52 returns from a clutch-off position to a clutch-on position.

Figure 11:
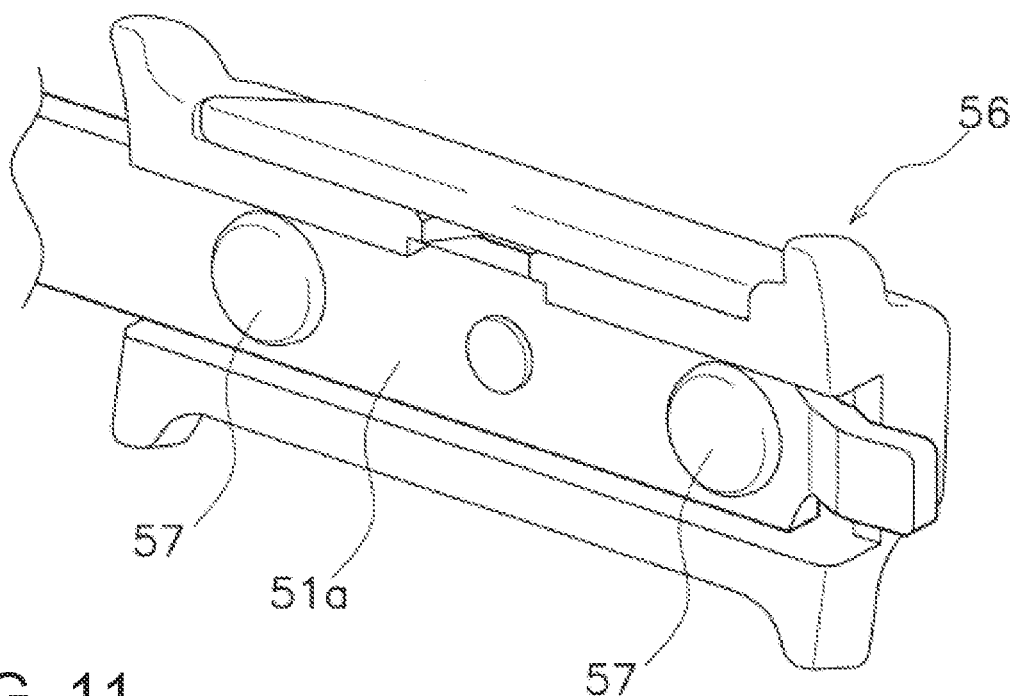
FIG. 11 is a perspective view of a cover member.
Figure 12:
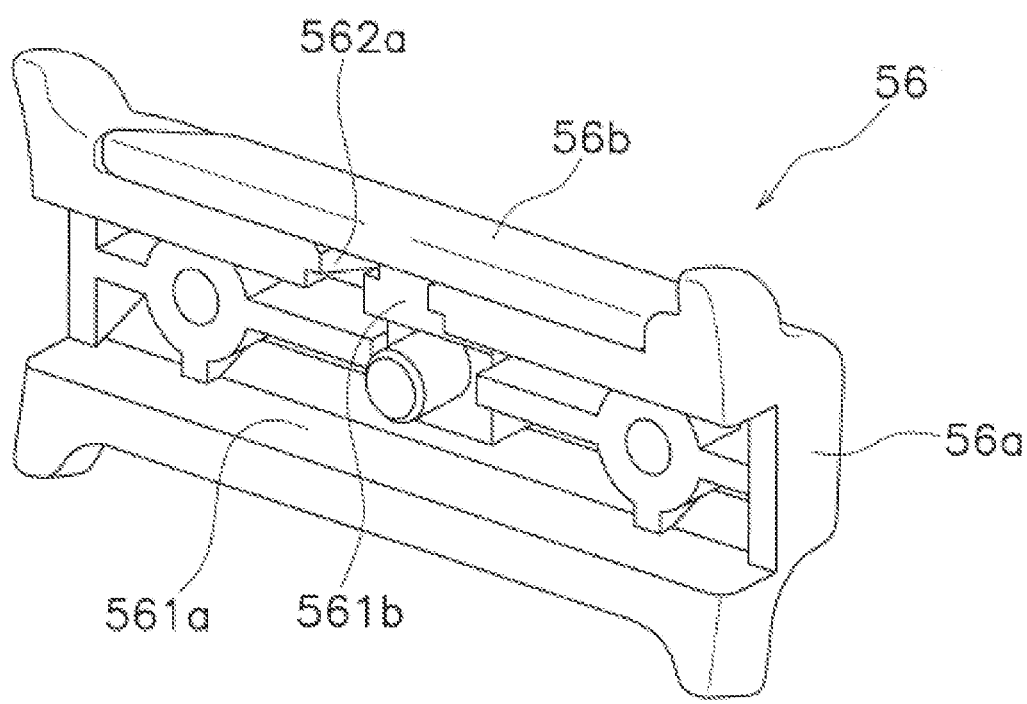
FIG. 12 is a perspective view of a cover member.

FIG. 11 is a perspective view of a cover member 56 in a state of attachment to the clutch plate 51. FIG. 12 is a perspective view of the cover member 56 in a state of detachment from the clutch plate 51. As shown in FIG. 11, the cover member 56 is attached to the main body portion 51*a* of the clutch plate 51.

As shown in FIG. 12, the cover member 56 comprises an attaching portion 56*a* and a cover portion 56*b*. An insertion groove 561*a* that extends in the axial direction is formed in the attaching portion 56*a*. The main body portion 511*a* of the clutch plate 51 is inserted in this insertion groove 561*a*. Additionally, an engagement groove 562*a* is formed in the attaching portion 56*a*. The engagement groove 562*a* communicates with the insertion groove 561*a*.

Figure 13:
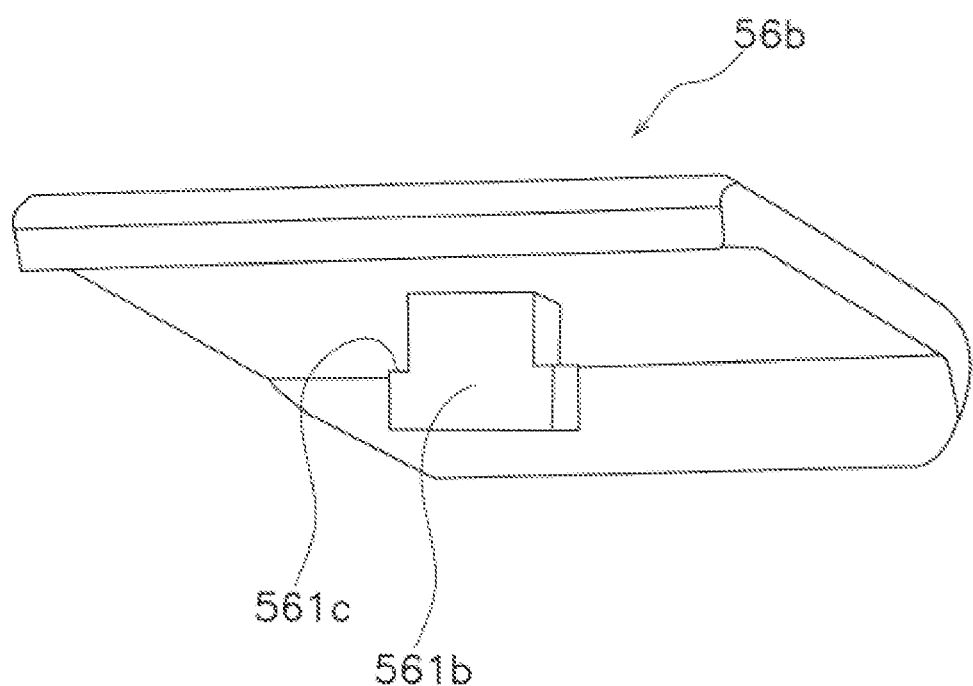
FIG. 13 is a perspective view of a cover portion.

FIG. 13 is a perspective view of a cover portion 56*b*. As shown in FIG. 13, the cover portion 56*b* comprises a protrusion 561*b*. The protrusion 561*b* fits into the engagement groove 562*a* (refer to FIG. 12). The protrusion 561*b* comprises a shoulder portion 561*c*. When attaching the cover portion 56*b* to the attaching portion 56*a*, the movement of the protrusion 561*b* upwards is restricted by this shoulder portion 561*c*. As shown in FIG. 11, the main body portion 51*a* of the clutch plate 51 is inserted in the insertion groove 561*a* after attaching the cover portion 56*b* to the attaching portion 56*a*. Then, the cover member 56 is screwed to the main body portion 51*a* of the clutch plate 51 with a bolt 57. With this configuration, the cover portion 56*b* is securely fixed to the attaching portion 56*a*.

Characteristics

The dual-bearing reel 100 according to the present embodiment has the following characteristics.

The first side end 51*b* of the clutch plate 51 is disposed so as to be closer to the rotational axis O than to the main body portion 51*a*. For this reason, the turning radius of the first side end 51*b* is smaller than the turning radius of the main body portion 51*a* when the clutch plate 51 rotates about the rotational axis O in order to operate the clutch mechanism 4. Therefore, it is possible to dispose the first guide groove 16, which holds the first side end 51*b*, closer to the rotational axis O than to the second guide groove 17. In other words, the radius of the outer peripheral edge of the first guide groove 16 can be made to be smaller than the radius of the outer peripheral edge of the second guide groove 17. As a result, in the present embodiment, it is possible to make the first side plate 11 smaller than the second side plate 12 by around 3-8 mm, improving the reel fit while palming.

MODIFIED EXAMPLE

Although each embodiment of the present invention has been presented heretofore, the present invention is not limited to the embodiments, and various modifications can be made without departing from the scope of the invention

Modified Example 1

In the embodiment described above, both the first and the second guide grooves have a circular arc shape, but the shapes of the first and second guide grooves are not particularly limited to this configuration. For example, at least either the first or the second guide groove may have a circular arc shape. Additionally, both the first and second guide grooves can have a shape that is not a circular arc shape. For example, the first and second guide grooves may be formed linearly.

Modified Example 2

In the embodiment described above, the first side plate 11 and the second side plate 12 are circular from the side view, but the shapes of the first and second side plates 11, 12 are not particularly limited to this configuration. For example, at least either the first or second side plates 11, 12 may be elliptical or have another shape from the side view.

What is claimed is:

1. A dual-bearing reel for casting fishing line in a forward direction, comprising:
   a spool configured to rotate about a rotational axis;
   a handle configured to rotate the spool;
   a clutch mechanism configured to selectively engage and disengage the handle and the spool;
   a first side plate disposed on a first side of the spool in an axial direction of the rotational axis;
   a second side plate disposed on a second side of the spool in the axial direction of the rotational axis; and
   a clutch operating member having a main body portion extending along the axial direction of the rotational axis between the first side plate and the second side plate, and having a first side end extending along the axial direction of the rotational axis, the first side end being disposed on a distal free end of the main body portion closer to the rotational axis than to the main body portion, the clutch operating member being configured to operate the clutch mechanism,
   the first side plate comprising a first guide groove slidably supporting the first side end, and
   the second side plate comprising a second guide groove slidably supporting the main body portion.

2. The dual-bearing reel recited in claim 1, wherein the clutch operating member further comprises a stepped portion disposed between the main body portion and the first side end.

3. The dual-bearing reel recited in claim 1, wherein the first side plate comprises a first side plate main body portion and a first support portion fixed to the first side plate main body portion and comprises the first guide groove.

4. The dual-bearing reel recited in claim 1, wherein the second side plate comprises a second side plate main body portion and a second support portion fixed to the second side plate main body portion and comprises the second guide groove.

5. The dual-bearing reel recited in claim 1, wherein the first side end has a width that is smaller than a width of the main body portion.

6. The dual-bearing reel recited in claim 1, wherein at least one of the first guide groove and the second guide groove has a circular arc shape with the rotational axis as the center.

7. The dual-bearing reel recited in claim 1, wherein the first and the second side plates are circular from a side view, and
the first side plate has a radius that is smaller than a radius of the second side plate.

8. The dual-bearing reel recited in claim 1, wherein the first guide groove is disposed on an outer peripheral part of the first side plate, and
the second guide groove is disposed on an outer peripheral part of the second side plate.

9. The dual-bearing reel recited in claim 1, wherein the main body portion and the first side end are positioned behind the spool.

10. A dual-bearing reel for casting fishing line in a forward direction, comprising:
    a spool configured to rotate about a rotational axis;
    a handle contoured to rotate the spool;
    a clutch mechanism configured to selectively engage and disengage the handle and the spool;
    a first side plate disposed on a first side of the spool in an axial direction of the rotational axis;
    a second side plate disposed on a second side of the spool in the axial direction of the rotational axis; and
    a clutch operating member having a main body portion extending along the axial direction of the rotational axis between the first side plate and the second side plate, having a first side end extending along the axial direction of the rotational axis and being disposed closer to the rotational axis than to the main body portion, and being configured to operate the clutch mechanism,
    the first side plate comprising a first guide groove slidably supporting the first side end,
    the second side plate comprising a second guide groove slidably supporting the main body portion,
    the first and the second guide grooves having a circular arc shape with the rotational axis as the center, and
    the first guide groove having a radius that is smaller than a radius of the second guide groove.

11. The dual-bearing reel recited in claim 10, wherein the first guide groove has a length that is shorter than a length of the second guide groove.

12. A dual-bearing reel for casting fishing line in a forward direction, comprising:
    a spool configured to rotate about a rotational axis;
    a handle configured to rotate the spool;
    a clutch mechanism configured to selectively engage and disengage the handle and the spool;
    a first side plate disposed on a first side of the spool in an axial direction of the rotational axis;
    a second side plate disposed on a second side of the spool in the axial direction of the rotational axis; and
    a clutch operating member having a main body portion extending along the axial direction of the rotational axis between the first side late and the second side plate, having a first side end extending along the axial direction of the rotational axis and being disposed closer to the rotational axis than to the main body portion, and being configured to operate the clutch mechanism,
    the first side plate comprising a first guide groove slidably supporting the first side end,
    the second side plate comprising a second guide groove slidably supporting the main body portion, and
    the first guide groove having a width that is smaller than a width of the second guide groove.

* * * * *